Figure 8:
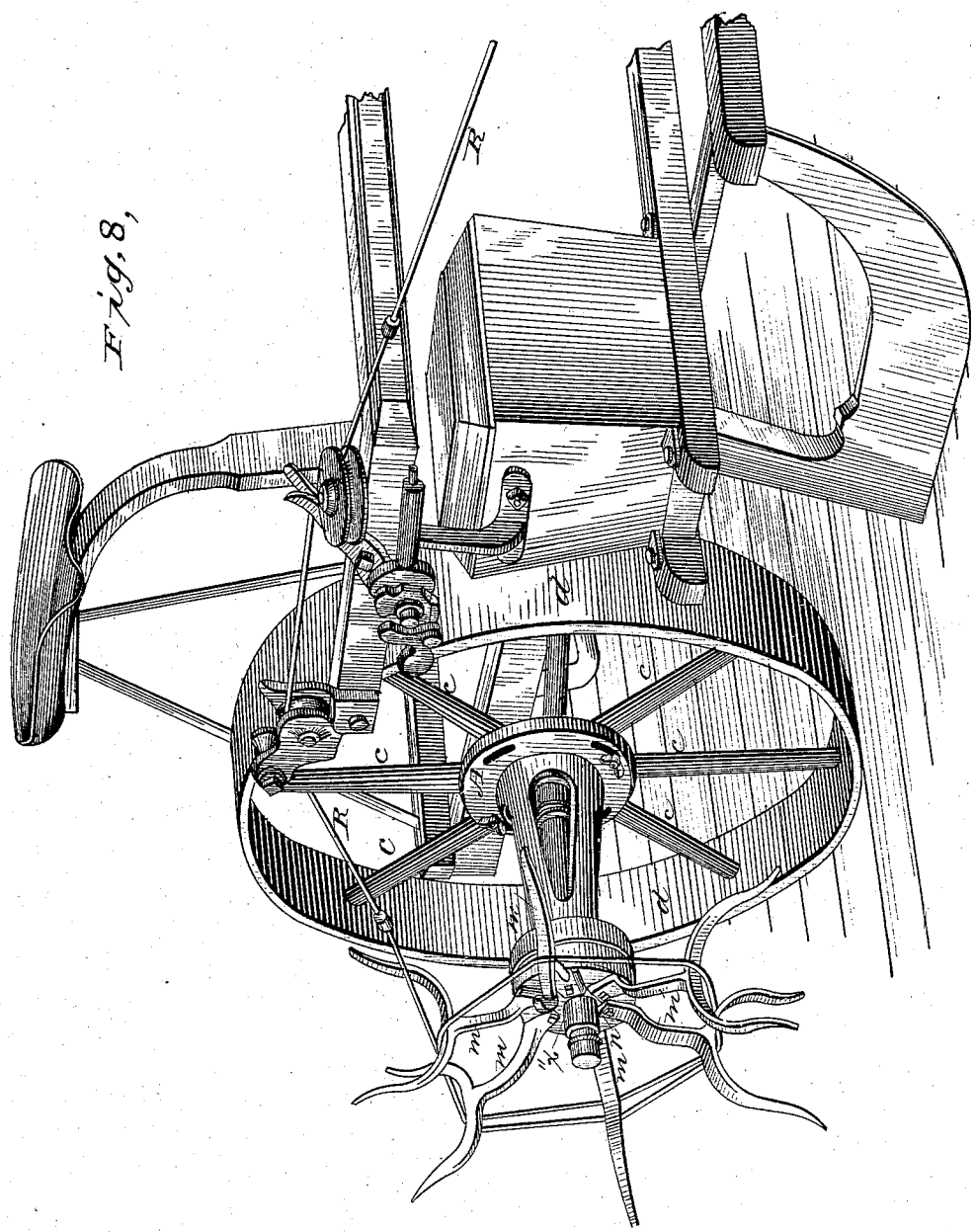

(No Model.)  3 Sheets—Sheet 1.
L. E. WATERMAN.
CHECK ROWER, REEL AND DRILL.
No. 265,197. Patented Sept. 26, 1882.
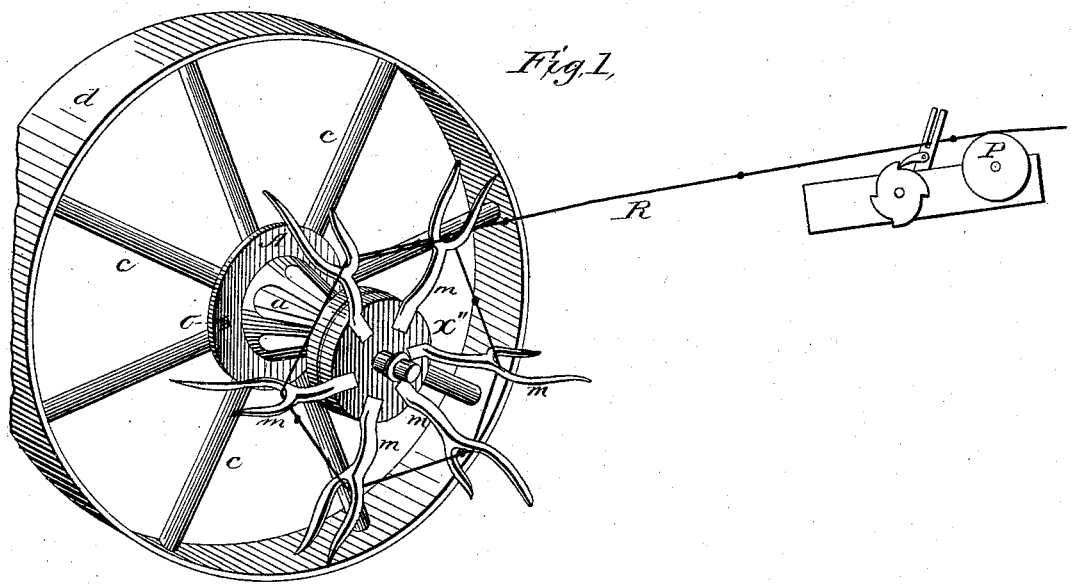
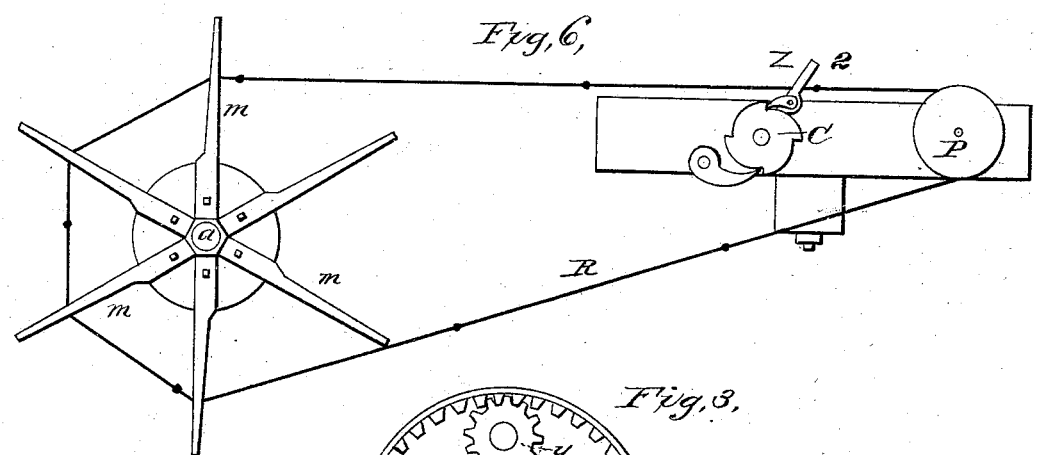
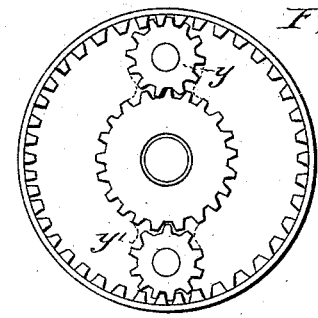
WITNESSES:
Fred. G. Dieterich
Jno. W. Stackett
INVENTOR.
Lewis E. Waterman
By DeWitt C. Allen
ATTORNEY.

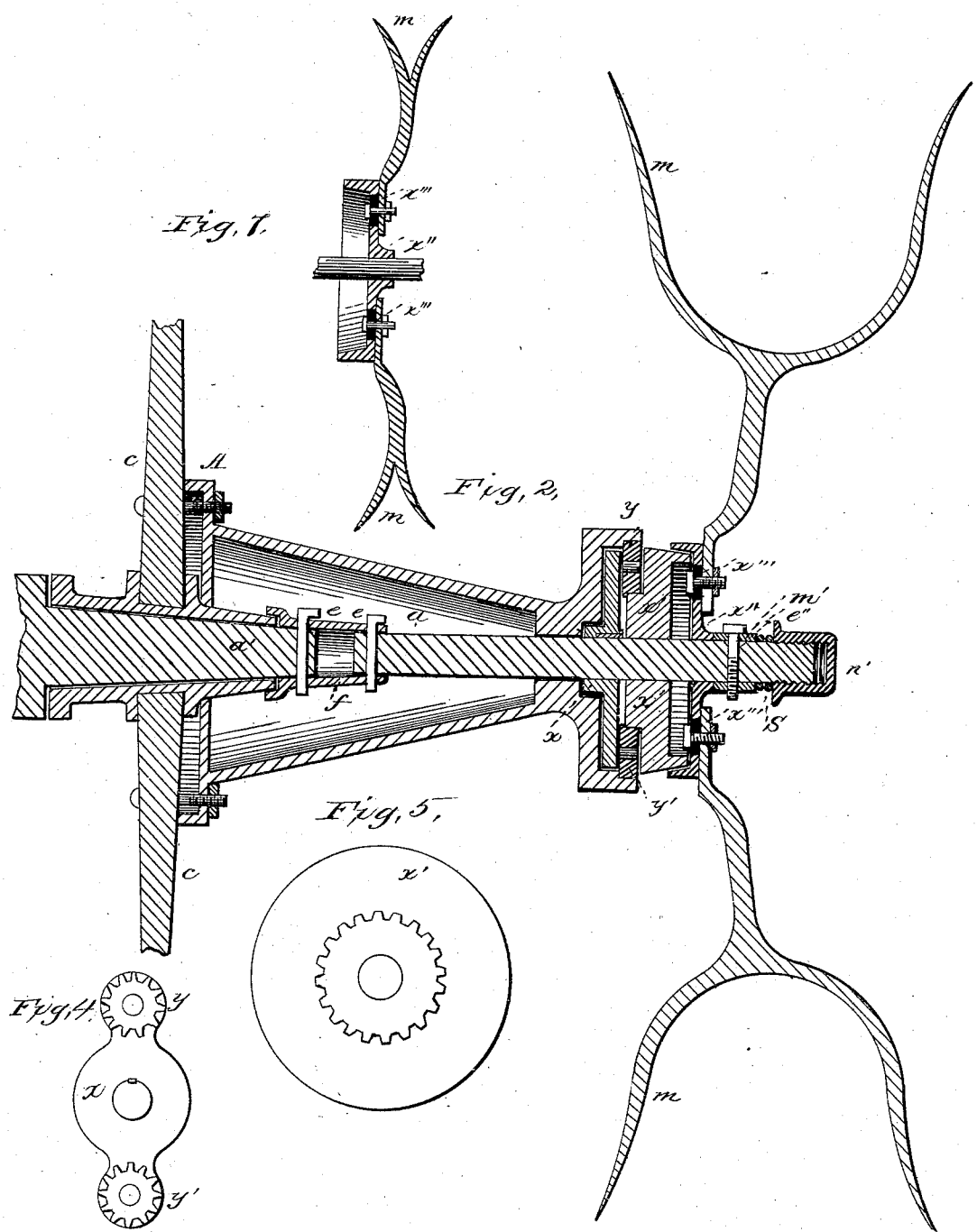

(No Model.)  
3 Sheets—Sheet 3.

L. E. WATERMAN.
CHECK ROWER REEL AND DRILL.

No. 265,197.  
Patented Sept. 26, 1882.

WITNESSES:  
Fred. G. Dieterich.  
Charles H. Baker.

INVENTOR.  
Lewis E. Waterman  
by De Witt C. Allen  
his ATTORNEY.

UNITED STATES PATENT OFFICE.

LEWIS E. WATERMAN, OF MASON CITY, ILLINOIS.

CHECK-ROWER REEL AND DRILL.

SPECIFICATION forming part of Letters Patent No. 265,197, dated September 26, 1882.

Application filed April 11, 1882. (No model.)

*To all whom it may concern:*

Be it known that I, LEWIS E. WATERMAN, of Mason City, in the county of Mason, and in the State of Illinois, have invented certain new and useful improvements in corn-planter attachments for reeling wire of a check-rower and for drilling; and I do hereby declare that the following is a full, clear, and exact description thereof, reference being had to the accompanying drawings, and to the letters of reference marked thereon, making a part of this specification, in which—

Figure 1 is a view in perspective of the spool or reel device embodying my invention. Fig. 2 is a vertical longitudinal section. Fig. 3 is an end elevation of the gearing. Fig. 4 is an end elevation of the fixed lever-support of the pinions. Fig. 5 is an end elevation of one of the friction-wheels with gear-wheel attached. Fig. 6 is an end elevation of the reel or spool as connected with a check-rower for drilling. Fig. 7 is a detached view of the reel or spool. Fig. 8 is a perspective view of my improved device as applied to a corn-planter.

This invention relates to a spool or reel attachment to be applied to a corn-planter to be used in connection with a check-rower for the purpose of paying out and winding up the rope or wire when beginning or finishing the planting of a field, and also for the purpose of operating a check-rower as a drilling attachment.

The invention consists in the arrangement of a shaft attached to the end and forming an extension of the axle-tree of a corn-planter upon which the reel or spool revolves, and also the geared mechanism. The outer end of said shaft is supported by a hollow cone, the base of which is bolted to the spokes of the cornplanter wheel, said cone terminating in an enlarged open end, in which is cast an annular wheel.

It also consists of two conical friction-wheels, regulated by a spiral spring and nut or cap screwed upon the end of the shaft; and it finally consists in the particular construction and arrangement of the gearing mechanism, all as will be hereinafter fully described.

The cone A is clamped to the spoke $c$ of the planter-wheel $d$, so that its center will coincide with the center of the wheel $d$, and the shaft $a$ is attached to the end of the axle $a'$ by means of the thimble $f'$ and pins $e$ and $e$. The fixed lever-support $x$ is keyed to the shaft $a$, and the pinions $y$ and $y'$ are mounted upon pins near the ends of the fixed lever-support. The friction-wheel $x'$ is mounted loosely upon the shaft $a'$, and is provided with cogs, as shown in Fig. 5, which engage the pinions $y$ and $y'$. The cone A is enlarged at its outer end, and forms an annular wheel, which engages the pinions $y$ and $y'$, as shown in Fig. 3. The friction-wheel $x''$ (see Fig. 2) is mounted loosely upon the shaft $a$, and has a lip, which overlaps a smaller lip upon the friction-wheel $x'$. The thimble $n'$ is provided with a slotted hole, so that it may be moved endwise upon the shaft $a$, the pin $e''$ passed through the slotted hole in the thimble $n'$, and also through the shaft $a$, so as to prevent the thimble from turning with the friction-wheel $x'$ $x'$.

S represents a spiral spring surrounding the shaft $a$ between the thimble $n$ and the capnut $n'$.

$m$ $m$ are the curved arms of the reel or spool, fastened to the outer face of the friction-wheel $x''$.

In Fig. 6, C represents an end elevation of a check-rower attachment upon which the pulley P is mounted, and R represents a knotted rope or wire passing as a belt around the pulley P and the reel-arms $m$ $m$.

The operation of the device is as follows: In passing over the ground the wheel $d$ revolves, and the cone A, provided with the annular wheel, as shown in Fig. 3, revolves with it. This propels the pinions $y$ and $y'$, which impart a rotary motion to the friction-plate $x'$, provided with cogs, as seen in Fig. 5, in contrary direction to that of the wheel $d$. The motion of the plate $x'$ is communicated to the wheel $x''$ by means of friction between the projecting lips. The amount of this friction is regulated by the cap-nut $n$, and also the spring.

The office and objects of the friction-wheels are as follows: In winding up, as the wire or rope accumulates upon the reel the circumference of the skein is constantly increasing, and consequently the rapidity with which the wire or rope would be taken up would correspondingly be increased if the reel were rigidly attached. The friction-wheels slip when the tenon upon the wire or rope exceeds the required amount, and by that means the reel is automatically adjusted to the requirements of the case.

The above observations apply only when the wire or rope is taken up. In laying the wire or rope across a field the operation is as follows: The cap-nut $n'$ is unscrewed to that extent that there is little or no pressure against the friction-plate $x''$, in which case the reel can revolve independently upon the shaft $a$.

The mode of using my device is as follows: The wire or rope is supposed to be wound upon the reel, the planter being in position for laying the wire or rope, and the reel adjusted, as described, for laying the wire or rope. The end of the wire or rope is passed through the operating devices of a check-rower and drawn back to the rear of the planter and fastened to the ground. Then as the planter passes across the field the wire or rope is paid out with a uniform tension throughout its entire length, and the planter operated at the same time. Upon arriving at the end of the first row the reel is detached, and the planting proceeds in the usual manner. In taking up or gathering the wire or rope the reel is adjusted, as already described, for that purpose, and the rope or wire is wound upon the reel as the planter proceeds, passing through and operating the check-row at the same time.

I will now describe the mode of using my device as an attachment for drilling.

The rope R is used as a belt, passing around the reel and the pulley P, and operating a check-rower in its passage through the forked arm, as shown at $z$ in Fig. 6. The reel is adjusted the same as when taking up or gathering in the wire or rope, as hereinbefore described. The distance between the knots on the rope R will regulate the rapidity of dropping the seed.

The reel-arms $m$ are curved, and secured to the plate $x''$ by bolts passing through elongated slots $x'''$, and nuts for securing said bolts in position, whereby the arms are adapted to be radially adjusted for enlarging or contracting the reel or spool, as may be deemed expedient.

Further description of the operation of my attachment is deemed unnecessary, it being obvious from the foregoing.

I am aware that the main shaft of a check-rower corn-planter has wire reels or spools mounted and secured thereon near its ends for paying out and reeling the wire, and driving-wheels loosely mounted on same shaft, and mechanism for throwing said driving-wheels into and out of gear with the shaft is old, and such I do not claim as of my invention.

Having thus fully described my invention, what I claim as new, and desire to secure by Letters Patent, is—

1. The combination, with a drive-wheel and axle of a corn-planter check-rower, of a shaft connected to one end of said axle and forming an extension thereof, and a rope or wire reel or spool loosely mounted on said shaft, and intermediate connecting mechanism for operating or revolving the rope or wire reel or spool, substantially as and for the purpose specified.

2. The combination, with drive-wheel and the axle of a corn-planter check-rower, of a shaft connected to one end and forming an extension thereof, and a rope or wire reel or spool loosely mounted thereon, and a friction-clutch for automatically adjusting the movements of said reel or spool in regulating the tension of the rope or wire, substantially in the manner specified.

3. The combination, with a drive-wheel and the axle of a corn-planter check-rower, of a shaft connected to one end and forming an extension thereof, a rope or wire reel or spool loosely mounted thereon, a friction-clutch connecting said reel or spool to the extension-shaft, and mechanism for connecting and operating said friction-clutch through the medium of said drive-wheel, substantially as and for the purpose specified.

4. The combination, with a drive-wheel and the axle of a corn-planter check-rower, of a shaft connected to one end of said axle and forming an extension thereof, and a rope or wire reel or spool loosely mounted thereon, a friction-clutch connecting the reel or spool to the extension-shaft, and spring-adjusting mechanism adapted to loosely engage said clutch, so that the reel or spool may revolve loosely on its shaft, substantially as and for the purpose specified.

5. The combination, with a drive-wheel and the axle of a corn-planter check-rower, of a shaft connected to one end and forming an extension thereof, a rope or wire reel or spool loosely mounted thereon, an adjustable friction-clutch, geared mechanism, and a conical shell connected to said drive-wheel for operating the reel or spool, substantially as specified.

6. The combination, with a drive-wheel and the axle of a corn-planter check-rower, of a shaft connected to one end and forming an extension thereof, a reel or spool mounted on said shaft, and intermediate connecting mechanism, substantially as described, for operating said reel or spool, a pulley, P, and a knotted rope or wire passing around said reel or spool and pulley and adapted to engage the usual check-rower devices of a corn-planter, substantially as and for the purpose specified.

7. The combination, with a drive-wheel and axle of a corn-planter check-rower, of a conical shell connected at its enlarged end to the drive-wheel, its smaller end provided with an enlarged case having an internal gear, fixed lever carrying pinions $y\ y'$, friction-wheel $x'$, provided with cogs and a beveled lip around its circumference, friction plate or wheel $x''$, provided with a similar lip, shaft $a$, connected at one end to axle $a'$ inside of the conical shell, and having a rope or wire reel or spool loosely mounted thereon, and which consists of the friction plate or wheel $x''$ and arms $m$, bolted thereto, the several parts arranged relatively to each other substantially in the manner as described, and for the purpose specified.

In testimony that I claim the foregoing I have hereunto set my hand this 13th day of March, 1882.

LEWIS E. WATERMAN.

Witnesses:
 THOS. SLADE,
 T. A. BEALL.